UNITED STATES PATENT OFFICE.

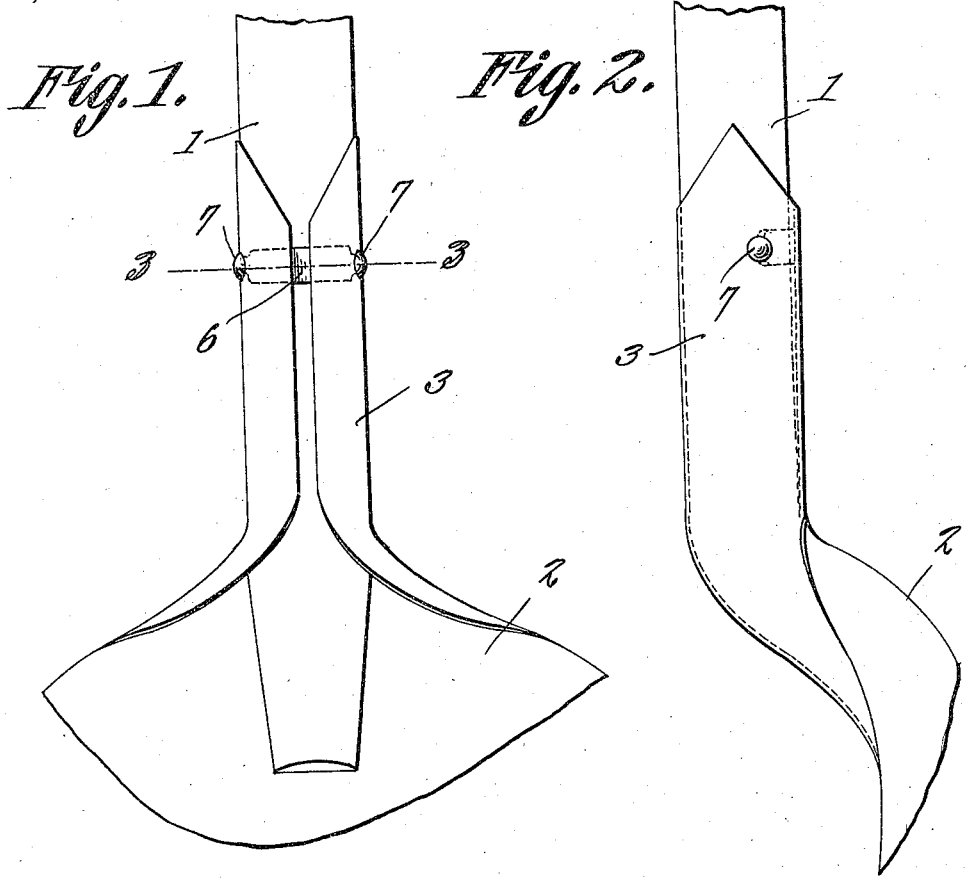
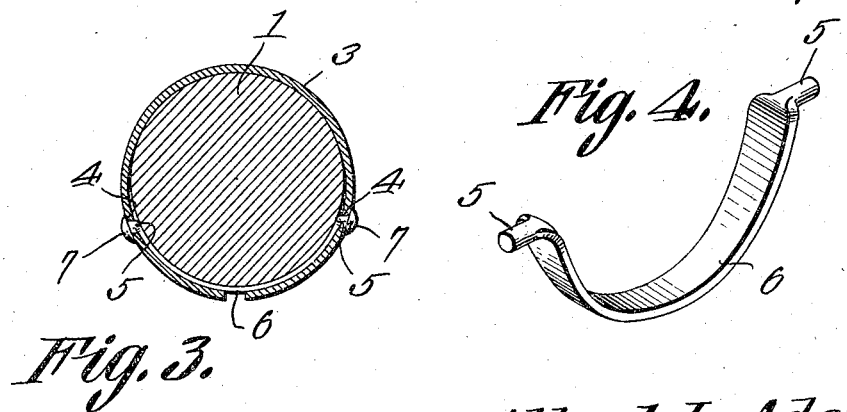

ALBERT L. ADAMS, OF CEDAR RAPIDS, IOWA.

HANDLE-FASTENING.

1,179,262. Specification of Letters Patent. Patented Apr. 11, 1916.

Application filed December 16, 1914. Serial No. 877,548.

*To all whom it may concern:*

Be it known that I, ALBERT L. ADAMS, a citizen of the United States, residing at Cedar Rapids, in the county of Linn and State of Iowa, have invented a new and useful Handle-Fastening, of which the following is a specification.

The present invention relates to improvements in handle fastenings, being more especially adapted to shovel handles, one object of the invention, being the provision of means whereby the usual rivet hole for connecting the scoop of the shovel to the handle is dispensed with, thus not weakening the handle at such point, the fastening providing a clamp, whereby the handle receiving socket of the scoop portion of the shovel frictionally engages the reduced end of the handle to properly attach the scoop thereto.

A further object of the present invention, is the provision of a simple, inexpensive and durable means for attaching a scoop or shovel to a handle, and by means of which the handle is frictionally gripped throughout the length of the handle receiving portion of the scoop and is thus, instead of being weakened by the engagement thereto, reinforced thereby.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a rear view of the upper portion of a shovel scoop and the lower end of the handle showing the present fastening device in operation. Fig. 2 is a side elevation taken from the left as viewed in Fig. 1. Fig. 3 is a cross section taken on line 3—3 of Fig. 1. Fig. 4 is a perspective view of the clamping band or yoke.

Referring to the drawings, the numeral 1 designates the handle and 2 the scoop, both of which are of usual construction, the scoop being provided with the split socket or clamping member 3 for the reception of the reduced end of the handle 1. The socket 3 as clearly illustrated, is provided with the two apertures 4, which are slightly offset as regards the diametrical line of the socket 3, so that the reduced malleable terminals 5 of a clamping band or yoke 6 and which are cylindrical in cross section may be inserted through from the inside of the openings 4 with the band or yoke 6 resting against the handle 1, whereby when the ends of the terminals 5 are riveted as at 7, the socket 3 will be clamped fixedly upon the handle 1 so as to secure the scoop 2 in proper relation to the handle 1 without the necessity of producing the usual rivet receiving holes or bores in the handle 1. It will thus be seen that by riveting the terminals 5 of the clamping band 6, or yoke the split socket 3 will be drawn tightly upon and in clamped relation to the handle 1 and the split socket 3 will therefore reinforce the handle 1 instead of weakening the same as is the present practice when a rivet is passed through the handle 1 and through the openings 4 of the split socket 3.

What is claimed is:

1. The combination with a handle and the article attached thereto, said article being provided with a split handle socket and provided with apertures therethrough, of means for clamping the split socket upon the handle including a flat curved strip having riveting ends introduced through the openings of the socket with the riveting ends thereof projecting beyond the outer face of the split socket and riveted thereupon to draw the split socket and the strip in clamping relation upon the handle.

2. A handle fastening, including a split socket, said socket being provided with two rivet receiving openings, and a curved strip having rivet terminals for introduction through the openings from the interior thereof, said curved strip completing with the split socket a handle encircling member, the heading of the rivets causing the split socket and strip to be clamped upon a handle.

3. A handle fastening, including a handle, a member attached thereto provided with a split socket, said socket being provided with two openings at equidistant points from the split portion thereof and said openings being beyond the diametrical center line of the socket toward the split opening, and a securing plate of less than half the diameter of the split socket fitting within the split socket and bridging the split thereof, said plate being provided with cylindrical riveting terminals introduced from the interior through the openings of the split socket and riveted upon the outside thereof to form with the split socket a surrounding clamp to embrace the handle.

4. A handle fastening including a split socket provided with separate openings, and a curved strip having terminals for introduction through the openings, said strip completing, with the split socket, a handle encircling member and constituting means for binding the split socket upon a handle therein.

5. A handle fastening including a split socket provided with an opening, and a curved strip having a terminal for introduction through the opening, said strip completing, with the split socket, a handle encircling member and constituting means for binding the split socket upon a handle therein.

In testimony that I claim the foregoing as my own, I have hereto affixed my signature in the presence of two witnesses.

ALBERT L. ADAMS.

Witnesses:
ALBIA BLAHA,
LIBBIE BLAHA.

Copies of this patent may be obtained for five cents each, by addressing the "Commissioner of Patents, Washington, D. C."